May 27, 1924.
L. I. ZIEGLER
BEARING
Filed March 4, 1922
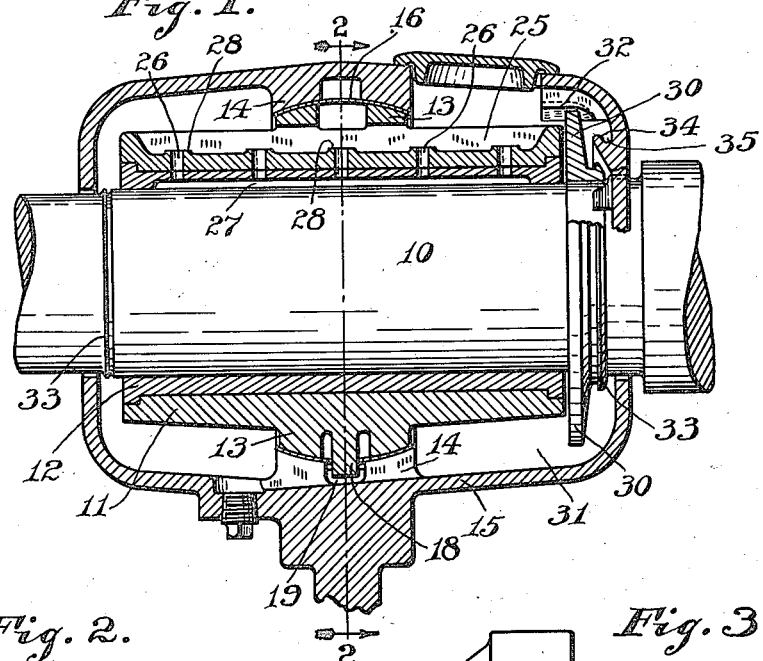
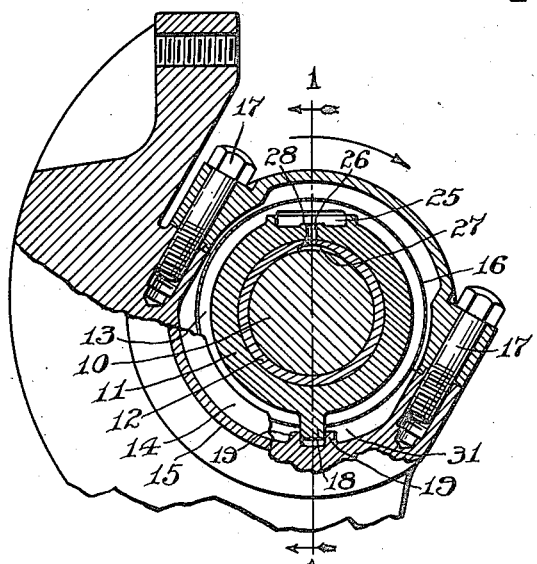
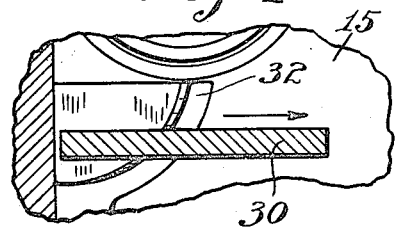
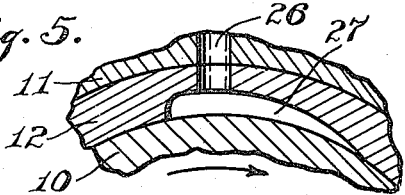
INVENTOR
Leslie I. Ziegler,
BY
ATTORNEY Patented May 27, 1924.

1,495,660

UNITED STATES PATENT OFFICE.

LESLIE I. ZIEGLER, OF INDIANAPOLIS, INDIANA, ASSIGNOR TO NORDYKE & MARMON COMPANY, OF INDIANAPOLIS, INDIANA, A CORPORATION OF INDIANA.

BEARING.

Application filed March 4, 1922. Serial No. 540,952.

*To all whom it may concern:*

Be it known that I, LESLIE I. ZIEGLER, a citizen of the United States, residing at Indianapolis, in the county of Marion and State of Indiana, have invented a new and useful Bearing, of which the following is a specification.

It is the object of my invention to improve the lubrication of shaft bearings, especially plain bearings, with more especial reference to bearings which carry their loads obliquely to the vertical, such as the roller bearings in flour mills. More particularly, it is the object of the invention to apply the lubricant efficiently to the bearing surfaces.

In carrying out my invention, I mount the shaft in a bearing as usual, the bearing preferably being lined with some bearing-metal, and on the bearing surface of such bearing-metal I provide a pocket which tapers off in depth gradually in the direction of rotation of the shaft with its bottom at an acute angle to the bearing surface, so that lubricant supplied to such pocket will be "smeared" on to the surface of the shaft without any tendency for it to be scraped off. I make the bearing surface unbroken from the pocket as far as possible in the direction of rotation of the shaft, to avoid breaking the film of oil, extending it for at least 90°, and preferably farther. I preferably locate this pocket at the top of the bearing surface, and connect it by supply holes to a supply cup on top of the bearing; and around these supply holes I provide bosses which are all of uniform height to insure an equalization of the lubricant supplied through the several supply holes. I preferably supply this supply cup with lubricant by carrying up oil thereinto by the rotation of the shaft, by a disk which dips into oil in the bearing box and carries it up to a deflecting flange which scrapes off the oil and throws it into the pocket.

The accompanying drawing illustrates my invention: Fig. 1 is a central longitudinal section through a bearing embodying my invention, being taken substantially on the line 1—1 of Fig. 2; Fig. 2 is a transverse section substantially on the line 2—2 of Fig. 1, though the section is a broken one and some parts are on other section lines; Fig. 3 is another transverse action, with the center part on the same line 2—2 of Fig. 1 but showing a two-part bearing, and with the upper part on different planes toward the right of Fig. 1; Fig. 4 is a section on the line 4—4 of Fig. 3; and Fig. 5 is a fragmental view showing an enlargement of the oil pocket in the bearing surfaces.

The shaft 10 is supported in the bearing 11, which is lined with bearing metal 12 of any suitable character; and the bearing 11 has circumferential supporting ribs 13 whereby it is supported on internal ribs 14 of a supporting casing or housing 15. The circumferential ribs 13 and 14 co-operate on spherical segmental surfaces, to permit the bearing to adjust itself in the casing 15 as required for alinement with the shaft 10, and laminated shims 16 may be inserted when necessary between the adjacent surfaces of the ribs 13 and 14. The outer casing 15 is conveniently made in two parts fastened together by clamping bolts 17 to clamp the bearing 11 in place. Such clamping is usually sufficient to prevent the bearing from rotating in its support; but I prefer to insure this by a projecting finger 18 at some convenient point around the bearing, preferably between the two spaced ribs 13, which finger 18 projects into the space between two cross-ribs 19 connecting the two spaced ribs 14. Though this is shown at the bottom of the bearing, the finger 18 and cross-ribs 19 may be located at any point around the circumference of the bearing.

I prefer to make the bearing 11 and its bearing-metal lining 12 as continuous cylinders, as shown in Fig. 2, so that there may be an unbroken film of oil on the bearing surfaces, without any joints in the bearing or bearing-metal to break such film. It is sometimes desirable, however, to provide one or two joints, which can be closed up more or less by the clamping action of the bolts 17. When only one joint is provided, I preferably provide it on the side of the bearing on which the shaft-surface is rising, as the joint 20 is shown in Fig. 3; such a joint can be provided by a saw-kerf through the bearing and bearing-metal lining, which saw kerf will be closed up as far as necessary by the clamping action of the bolts 17. If it is desired to make the bearing in two separable parts, I provide a joint 21 in addition to and substantially opposite the joint 20, as shown in Fig. 3; in which case I prefer to close the joint 21 as tightly as possible, to avoid breaking the oil film on the descending side of the shaft-surface, and to provide all the clearance at the joint 20. The laminated shims are more frequently used when the bearing has the saw kerf 20 or is made in separable parts, in order to compensate for taking up the bearing proper.

When the load on the shaft 10 is oblique to the vertical, as in the shafts of the rollers of flour mills, the joints 20 and 21, when provided, are transverse to the line of the load-thrust, as is also the joint between the two parts of the casing 15; but it is not essential that the joint between the two casing parts be in the same plane as the joints 20 and 21.

At the top of the bearing 11 I provide a longitudinal external supply cup 25, which extends the whole length of the bearing. I supply this cup with oil in a manner hereinafter explained. From this cup a plurality of oil-supply holes 26 lead through the bearing 11 and bearing-metal lining 12 into a pocket 27 on the inner surface of the lining 12, at the top of the bearing surfaces. This internal pocket 27 extends nearly the whole length of the bearing, and there may be any number of supply holes 26; and the upper ends of such supply holes open into the cup 25 through bosses 28, which are machined off at the top so that they are all of the same height and so that in consequence oil will be supplied through all the oil holes 26 uniformly.

The pocket 27 is of peculiar shape, as best shown in Fig. 5. It is of greatest depth below the supply holes 26, and tapers off gradually, or is of gradually decreasing depth, as it progresses around the shaft 10 in the direction of shaft rotation, with its bottom at an acute angle to the bearing surface; it is assumed that the shaft rotates in a clockwise direction, as indicated by the arrows in Figs. 2, 3, and 5. In consequence of this pocket shape, there is no edge or shoulder at the clockwise end of the pocket 27, tending to scrape off oil from the shaft 10, but instead there is a surface which leads at a small angle and without any scraping shoulder on to the inside bearing surface of the lining 12. In consequence, as the shaft rotates, the oil from the pocket 27 is spread uniformly on to, and not scraped off from, the surface of the rotating shaft—somewhat as butter is spread on a piece of bread by a knife—and drawn uniformly in between the bearing surfaces of shaft and bearing, thus greatly helping by a sort of wedging action in getting the oil to the proper place and accelerating the entrance of the oil between such bearing surfaces.

To supply the cup 25 with oil, I preferably provide the shaft 10 at at least one end of the bearing 11 with a projecting circumferential disk-flange 30, which dips into oil in the oil space 31 in the bottom of the casing 15. As the shaft rotates, the disk-flange 30 carries up a film of oil from the oil space 31. Near the top the casing 30 is provided with an internal-oil-scraping rib 32, which projects down into close proximity to the edge of the flange 30. This rib 32 is preferably curved as is shown in Fig. 4. In any case, it is of such shape that it scrapes off oil from the outer edge of the flange 30, and because of the momentum of such oil throws the latter lengthwise of the bearing and into the cup 25. This keeps the cup 25 well filled with oil.

The flange 30 also acts to limit the end play of the shaft 10. For this purpose it lies close to one end of the bearing 11, to abut against such end if the shaft tends to move toward the left (Fig. 1). A similar flange at a reversely arranged bearing on the same shaft, at the other end of the roller when the shaft carries a roller, prevents end play in the opposite direction.

Near each end of, and within, the casing 15 I provide the shaft 10 with an oil-deflecting rib 33, for throwing oil outward and thus keeping it from working out through the shaft-openings in the ends of the casing. In order further to prevent oil from working out through the shaft-openings in the ends of the casing, especially at the end where the flange 30 is provided, I provide the casing 15 on its end wall with an internal arc-shaped rib 34 which overlies the shaft and extends down on each side thereof sufficiently far so that drippage from the ends of the rib 34 and from the groove 35 between it and the end wall of the casing will drop clear of the shaft and shaft-opening as is clear from Fig. 4. If any oil which is thrown outward by the flange 34 tends to work along the inner surface and the casing 15 toward the shaft opening in the end of such casing, it is caught in the groove 35 and fed downward on one side or the other of the shaft 10 and dropped back into the oil space 31.

I claim as my invention:

1. A bearing, comprising an outer casing having in its end a hole for a shaft, a bearing mounted within said casing and having an oil cup on its top for supplying oil to the bearing surfaces, a shaft rotatably mounted in said bearing, said shaft having a flange within said casing for dipping into oil in the bottom of the casing and carrying such oil upward, an internal deflector projecting close to said flange to deflect oil therefrom into said oil cup, and an oil-deflecting rib provided on the inner surface of said casing above said hole for deflecting from the hole oil which creeps along the inner surface of the casing.

2. A bearing, comprising an outer casing having in its end a hole for a shaft, a bearing mounted within said casing and having an oil cup on its top for supplying oil to the bearing surfaces, a shaft rotatably mounted in said bearing, said shaft having a flange close to the end of the bearing between the bearing and the end of the casing having such hole, said flange being arranged to co-operate with the bearing end to limit end play of the shaft in one direction and to dip into oil in the bottom of the casing and carry such oil upward when the shaft rotates, an internal deflector projecting close to said flange to deflect oil therefrom into said oil cup, and an oil-deflecting rib provided on the inner surface of said casing above said hole for deflecting from the hole oil which creeps along the inner surface of the casing.

3. A bearing, comprising an outer casing having in its end a hole for a shaft, a bearing mounted within said casing and having an oil cup on its top for supplying oil to the bearing surfaces, a shaft rotatably mounted in said bearing, said shaft having a flange close to the end of the bearing between the bearing and the end of the casing having such hole, said flange being arranged to co-operate with the bearing end to limit end play of the shaft in one direction and to dip into oil in the bottom of the casing and carry such oil upward when the shaft rotates, and an internal deflector projecting close to said flange to deflect oil therefrom into said oil cup.

In witness whereof, I have hereunto set my hand at Indianapolis, Indiana, this 2nd day of March, A. D. one thousand nine hundred and twenty-two.

LESLIE I. ZIEGLER.